Nov. 18, 1930.   F. McKINSTRY   1,782,072
SYSTEM FOR PREVENTING THE FORMATION OF ICE ON AIRCRAFT
Filed June 19, 1928
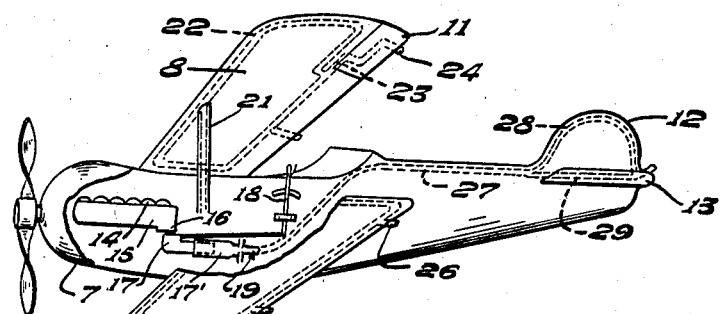
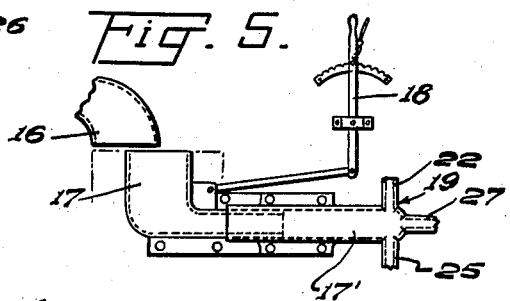
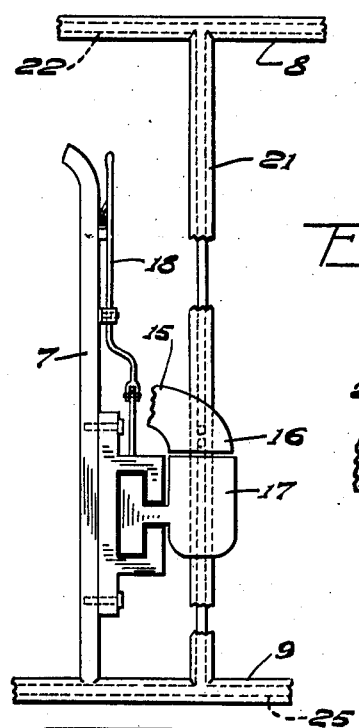
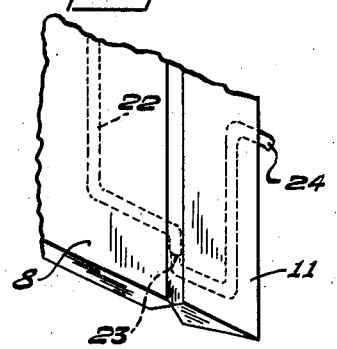
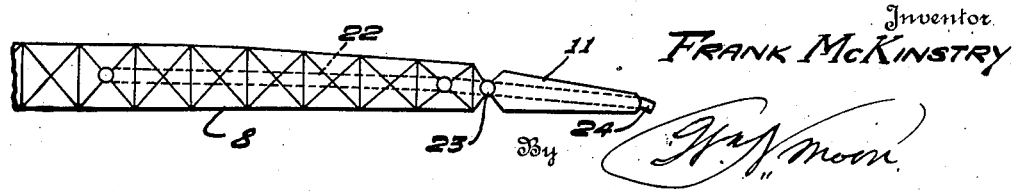
Inventor
FRANK McKINSTRY Patented Nov. 18, 1930

1,782,072

UNITED STATES PATENT OFFICE

FRANK McKINSTRY, OF NASHVILLE, TENNESSEE

SYSTEM FOR PREVENTING THE FORMATION OF ICE ON AIRCRAFT

Application filed June 19, 1928. Serial No. 286,681.

This invention relates to improvements in aircraft and has reference more particularly to a system for the prevention of the accumulation of ice upon the exposed surfaces thereof, the main object of the invention being the provision of means whereby the exhaust from the engine is utilized for this purpose.

Another object of this invention is the provision of a pipe system supported by the various exposed portions of the airplane, either of the biplane or monoplane type, and in which the exhaust is so conducted as to heat the exposed surfaces to raise the temperature thereof above the freezing point, and thus prevent the accumulation upon the surface of the airplane of ice.

In the accompanying drawings:—

Figure 1 is a perspective view of an airplane showing in dotted lines one method of installing the present invention;

Figure 2 is a cross-sectional view through one of the wings adjacent the aileron thereof;

Figure 3 is an enlarged detail sectional view adjacent the fuselage and one of the supporting struts between the wings of a biplane;

Figure 4 is a detail view showing the method of connecting the pipes to conduct the exhaust gases;

Figure 5 is a detail view showing the arrangement of the pipe adjacent the in-take part of the exhaust adjacent the motor and the means for controlling the same; and Figure 6 is a perspective view of a portion of the wing and aileron showing the method of mounting the present device therein.

Referring to the drawings, the numeral 7 designates the fuselage and 8 and 9 the wings of the present biplane type of airplane, although it is to be understood that the present arrangement is for use upon any other types of airplanes, it being essential that the exhaust from the engine be so used as to distribute heat throughout the exposed surface of both the fuselage and wings as well as the ailerons 11 and the vertical rudder 12 and the horizontal elevators 13 of the plane.

The engine 14 is mounted as usual and is provided with the exhaust manifold 15 which is indicative of any type that may be employed or any means for collecting the exhaust for distribution through the present system, but is here shown as connected in such a manner as to be placed into or out of alinement with the outlet 16 of the direct exhaust from the engine. A distributor 17 is adapted to receive the exhaust gases and through the instrumentality of the lever control means 18 be moved into and out of registration with the main exhaust of the engine. At the rear end of this distributor is a plurality of pipes 19 adapted to direct the exhaust to the various portions of the airplane body and wings, as heretofore described. In the present instance, one of these pipes is connected through the strut 21 which leads to the upper wing and through the lateral pipes 22 and the ailerons through a universal joint 23 and, finally, the outlet 24 at the edge of the ailerons. Another pipe leads to the installation 25 carried by the lower wing with the fixed exhaust 26. A third pipe 27 extends along the fuselage and is branched at the rear end thereof into the branches 28 and 29 which lead, respectively, to the vertical rudder and the horizontal elevators and exhaust at the rear tips thereof.

From the foregoing description, it is evident that the present device may be readily installed on any type of airplane, that the same is operable at the will of the operator to be placed in heat-directing position whenever it is desired in reaching high altitudes in the summertime, or for work in wintertime, and that with the distributing pipe so arranged throughout and adjacent the skin surface of the various elements, such surface will be maintained at a temperature above the freezing point by the easiest accessible heating means, the exhaust, so that the formation of ice upon the surface will be prevented.

It is also evident that by slight changes in contour of the heat-distributing pipes, the exterior surface of dirigibles can be heated to prevent the accumulation of snow and ice upon the exterior surface of the bag or bag covering.

What is claimed is:—

1. The combination with an airplane, exhaust manifold of an engine within the airplane and a heating system for distributing exhaust from the manifold throughout the plane, of a guide located at one side of the exhaust manifold, a movable distributor head telescopically engaged in the system and communicating with the exhaust manifold, a slider supporting the head, and means within reach of an operator of the plane to permit the head to be shifted with respect to the manifold, said manifold being superposed relative to said head, whereby the latter can travel beneath the manifold.

2. The combination with an airplane, exhaust manifold of an engine within the airplane and a heating system for utilizing exhaust for distribution throughout said plane, of a guide located at one side of the manifold, a movable distributor head telescopically engaged in the system and communicating with the manifold, a slider supporting the head, an operating lever having connection with the slider to permit the head to be shifted with respect to the exhaust manifold, said manifold being superposed relative to said head, whereby the latter can travel beneath the manifold, and means for latching the lever in shifted positions.

In testimony whereof I have hereunto set my hand.

FRANK McKINSTRY.